United States Patent [19]
Bell et al.

[11] Patent Number: 5,505,461
[45] Date of Patent: Apr. 9, 1996

[54] METHOD FOR MEETING IRS REPORTING REQUIREMENTS RELATED TO AN ELECTRONIC GAMING MACHINE

[75] Inventors: Lyle L. Bell, Las Vegas; Anthony J. Brolick, Boulder City; Cliff J. Hulme, Henderson; Daniel H. Scott, Las Vegas, all of Nev.

[73] Assignee: Caesars World, Inc., Los Angeles, Calif.

[21] Appl. No.: 229,729

[22] Filed: Apr. 19, 1994

[51] Int. Cl.[6] .............................. A63F 9/24; G07F 17/34
[52] U.S. Cl. ................. 273/433; 273/138 A; 273/143 R
[58] Field of Search ........................... 273/138 A, 143 R, 273/85 CP, 433

[56] References Cited

U.S. PATENT DOCUMENTS

| | | | |
|---|---|---|---|
| 4,072,930 | 2/1978 | Lucero et al. | 340/152 T |
| 4,283,709 | 8/1981 | Lucero et al. | 340/147 |
| 4,333,090 | 6/1982 | Hirsch | 340/365 |
| 4,636,951 | 1/1987 | Harlick | 364/412 |
| 4,669,730 | 6/1987 | Small | 273/138 A |
| 4,991,848 | 2/1991 | Greenwood et al. | 273/143 R |
| 5,038,022 | 8/1991 | Lucero | 235/380 |
| 5,136,644 | 8/1992 | Audebert et al. | 380/25 |
| 5,179,517 | 1/1993 | Sarbin et al. | 364/410 |
| 5,251,259 | 10/1993 | Mosely | 380/23 |
| 5,326,104 | 7/1994 | Pease et al. | 273/138 A |

*Primary Examiner*—Benjamin H. Layno
*Attorney, Agent, or Firm*—Lewis Anten; Amedeo Ferraro

[57] ABSTRACT

This invention relates to a new method for meeting the United States Internal Revenue Service's reporting requirements for electronic gaming machine devices such as slot machines.

The present invention provides a separate storage means that keeps track of gross winnings on individual plays of a slot machine that exceed a predetermined amount (jackpots), and permits the accumulating jackpot winnings to be used by the player for additional play of the slot machine. The amount of winnings in the jackpot meter is then used to determine the amount of winnings to be included on an IRS reporting form called a W2-G Form. The present invention avoids the time consuming and error prone system currently used and provides the player with a more enjoyable gaming experience, and at the same time provides the IRS with more accurate information. Rather than numerous W2-G Forms for each jackpot exceeding the predetermined limit, only a single W2-G Form need be prepared at the end of a playing session.

31 Claims, 4 Drawing Sheets

METHOD FOR MEETING IRS REPORTING REQUIREMENTS RELATED TO AN ELECTRONIC GAMING MACHINE

BACKGROUND OF THE INVENTION

FIELD OF THE INVENTION

This invention relates to a new method for meeting the United States Internal Revenue Service's (IRS) reporting requirements for gaming machine devices such as slot machines and video poker machines.

The IRS requires gaming establishments and casinos to report all payouts, also called jackpots, to players equal to or greater than a specified amount (currently $1,200) on IRS Form W2-G. For the purposes of this application, a payout in excess of the IRS reporting threshold is referred to as a jackpot. The casino is required to obtain the player's Taxpayer Identification Number and prepare a W2-G Form for each and every payout that meets the criterion defined above. Thus, each time a player receives $1,200 or more on a jackpot, the casino must stop play and then issue a W2-G Form. The IRS uses the W2-G Form to ensure that it collects taxes on jackpots. However, the IRS allows players to offset their winnings with documented losses. Typically this results in the taxpayer having to obtain proof of the losses incurred during the year, a cumbersome and risky project.

The IRS has used this procedure for many years because there was no technology available to capture the information in any other manner.

The current reporting procedure has proven to be very cumbersome particularly for slot machines recently introduced which accept up to $500 tokens. A player can play up to two of these tokens at a time. Any payout that exceeds two tokens currently requires a W2-G Form. Payouts of this size are very common. Each time the slot machine exceeds the IRS determined threshold, the slot machine is automatically "locked up" and cannot be played until an attendant prepares a W2-G Form and uses a key to clear the slot machine and make it ready to play again. This is a very tedious process which can result in literally hundreds of W2-G Forms being prepared and issued over several days. W2-G Form preparation is manual, and could be subject to error. It takes approximately 5 minutes to prepare a single W2-G Form.

Further, since the W2-G Form is prepared after each jackpot the W2-G Forms do not reflect any of the subsequent losses of the player of the jackpot winnings. Thus, the accumulated W2-G Forms grossly overstate the actual winnings of a player. For example, if a player plays $100.00 and wins a jackpot of $10,000.00 a W2-G Form is issued for $10,000.00. If the player subsequently plays all $10,000.00 and loses it all, the W2-G Form still shows $10,000.00 of reportable income.

SUMMARY OF THE INVENTION

The present invention eliminates the need to prepare a W2-G Form every time a payout exceeds the predetermined IRS threshold. Instead, the present invention automatically maintains the information in the slot machine required for the attendant to prepare a single W2-G Format the end of the playing session. The amount reported on the W2-G Form is the net jackpot winnings, which is the gross amount of jackpots less the amount subsequently wagered from the jackpot proceeds.

In the prior example of a player playing $100.00 and winning $10,000.00 and then losing $10,000.00 of jackpot proceeds, there would be no reportable income so no W2-G Form would be required.

This invention provides a new, efficient method for meeting the IRS reporting requirements for electronic gaming machine devices. The present invention avoids the time consuming and error prone manual system currently used in issuing W2-G Forms and provides the player with a more enjoyable gaming experience, and at the same time provides the IRS with more accurate information.

OBJECTS OF THE PRESENT INVENTION

It is an object of the present invention to efficiently generate an accurate IRS W2-G Form for the amount of net jackpot win in a playing session.

It is another object of the present invention to provide a simplified system of record keeping of reportable IRS winnings from a gaming device.

It is a further object of the present invention to obtain increased accuracy of reporting of IRS reportable gaming winnings.

It is another object of the present invention to save time for the player and casino.

It is another object of the present invention to provide convenience to the player and casino.

These and other objects of the present invention will become apparent from a review of the accompanying drawings and the detailed description of the drawings.

DETAILED DESCRIPTION OF THE DRAWINGS

Figure 1:
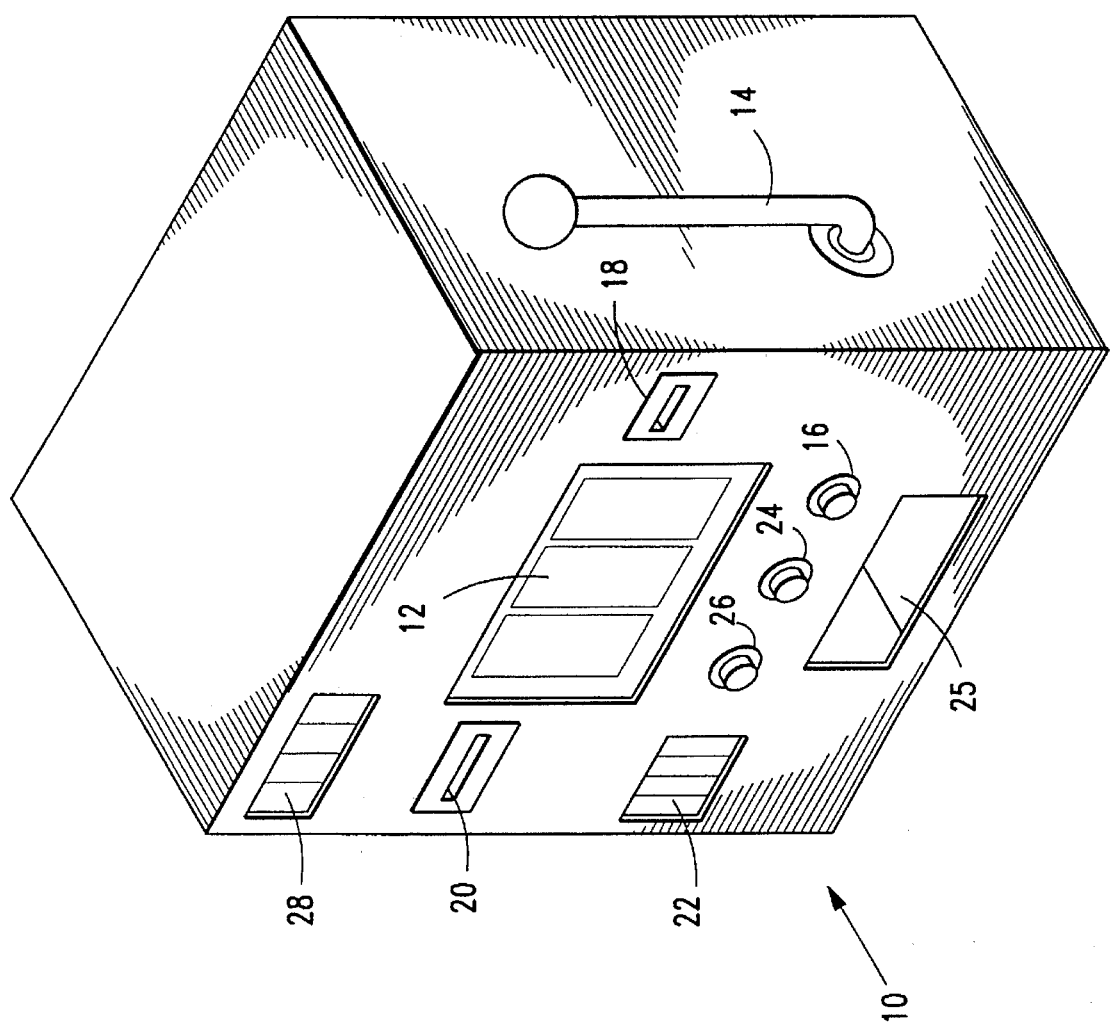
FIG. 1 is a front perspective view of a slot machine of the present invention.

Referring to FIG. 1, a gaming apparatus in the form of a slot machine 10 incorporating the features of the present invention is shown.

The slot machine 10 has the conventional features of a game display area 12, a starting mechanism which can be either a handle 14 or button 16; money or token inputs for either coins 18 and/or paper currency 20; the conventional credit display 22; a betting control button 24; a payout hopper 25; and a conventional credit payout button 26.

In addition to the above conventional features, the slot machine 10 of the present invention includes a second credit display 28 for displaying net jackpot winnings. In the preferred embodiment the second credit display 28 is a separate display from the conventional credit display 22. By means of suitable electronic controls, a single credit display may be used to display both the conventional credits and the net jackpot winnings.

Figure 2:
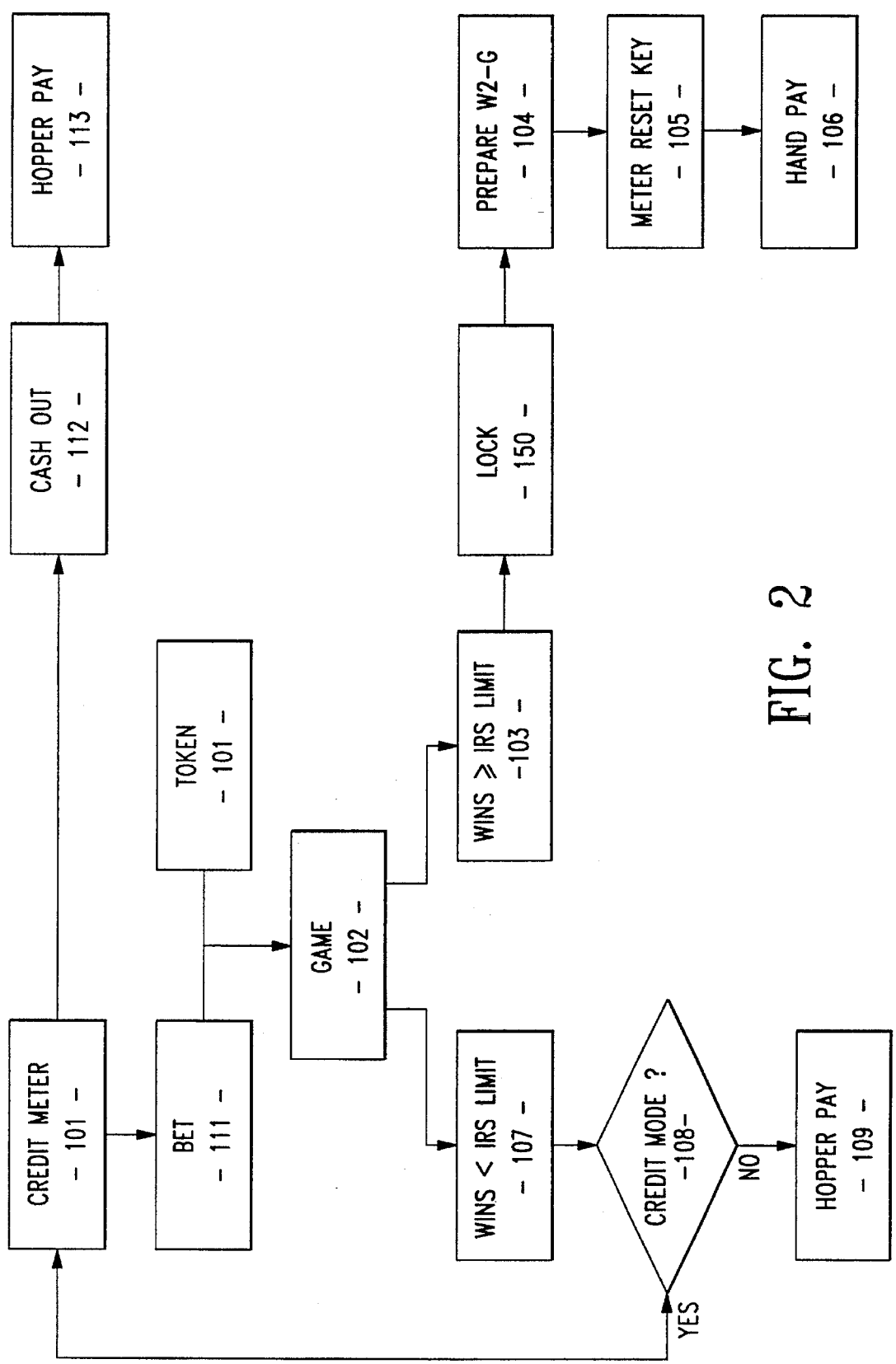
FIG. 2 is a block diagram flow chart of the prior art method of reporting reportable winnings.

FIG. 2 is a flow chart showing the prior art method for preparing W2-G Form's for jackpot winnings. The IRS limit is predetermined. The player initiates a game by inserting money in the form of a token, coins, or paper money into the money slot 101 of the gaming device. The game 102 is played. If the game results in a winning combination of symbols resulting in a payout, the logic in the gaming device's microprocessor checks whether the dollar value of the payout is equal to or greater than the predetermined IRS limit. If this is true 103, the slot machine 10 is locked 150 to prevent further play. An attendant prepares a W2-G Form 104 and then uses a meter reset key 105 to reset the slot machine to enable further play. The jackpot is hand paid 106 by the attendant. The microprocessor used in slot machines is standard and well known to those in the industry, as are comparison circuits and memory storage devices associated with credit meters.

If the payout is less than the IRS limit 107, the gaming device's microprocessor checks to see if the slot machine is being played in credit mode 108. If it is not being played in credit mode 108, the tokens are paid out through the hopper 109 and the player can replay them at 101. If the slot machine is operating in credit mode 108, a value of credits corresponding to the payout amount is placed on the gaming device's credit meter 110. The player can play these credits by pressing the credit bet key 111. Alternatively, the player may press the cash out button 112 and retrieve tokens from the hopper 113.

Figure 3:
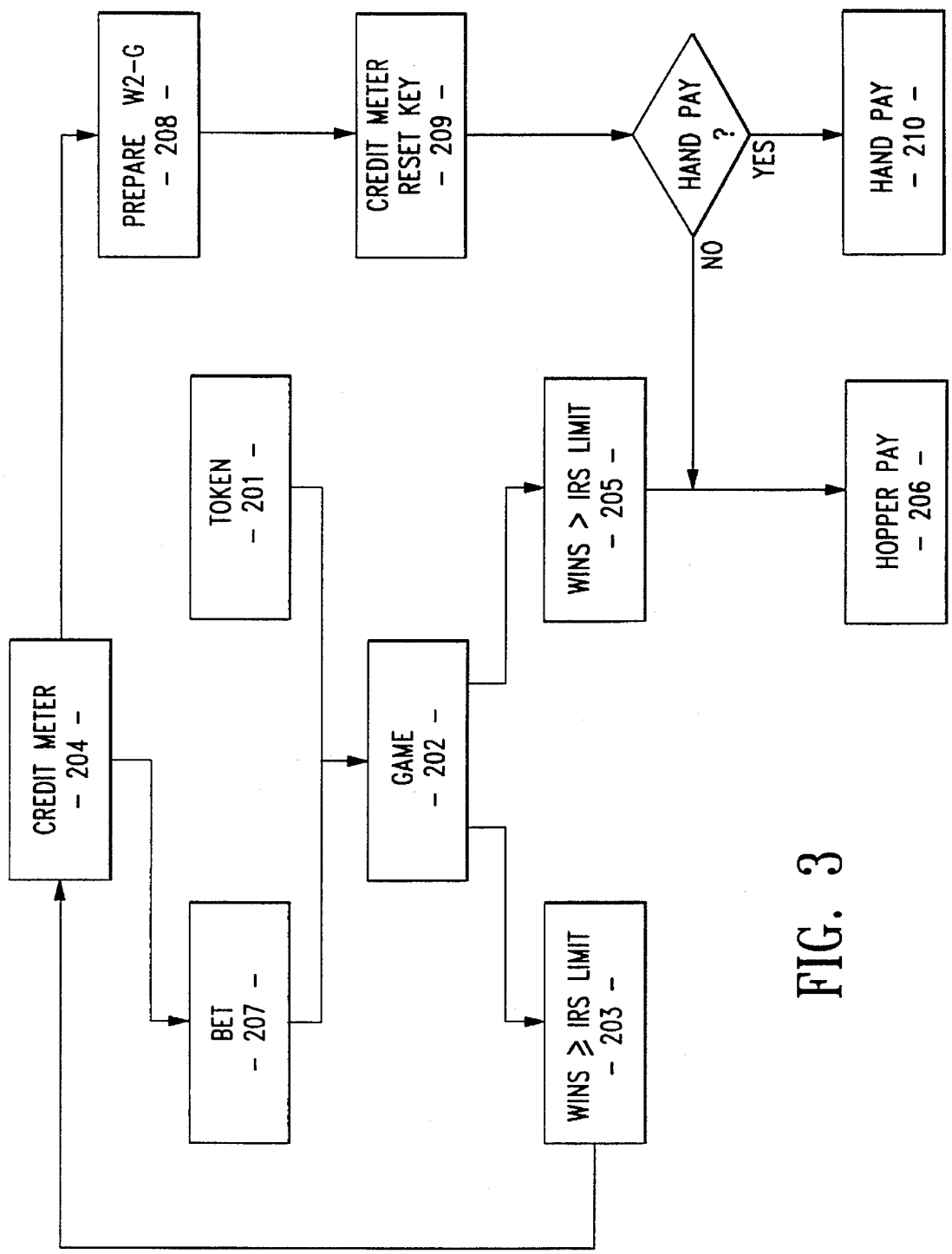
FIG. 3 is a block diagram flow chart of a first embodiment of the method of reporting reportable winnings of the present invention.

FIG. 3 shows the flow chart of the present invention in a gaming device which accepts gaming tokens or coins exclusively. The IRS limit is predetermined. The player initiates a game by inserting a token or coin into the gaming device 201. The game 202 is played. If the game results in a winning combination of symbols, the logic in the gaming device's microprocessor checks whether the dollar value of the payout is equal to or greater than the IRS limit. If this is true 203, the number of credits corresponding to the payout amount is automatically transferred to the gaming device's IRS reportable credit meter 204. If the payout is less than the IRS limit 205, the tokens are automatically paid through the hopper 206. This method guarantees that all winnings that are reportable to the IRS are automatically placed on the IRS reporting credit meter 204 for later use in preparing the W2-G Form. The player then places a bet 207 which amount is deducted from the IRS reportable credit meter 204.

The amount reported on the W2-G Form should consist of the gross winnings from jackpots greater than the IRS limit, less the amount of those winnings that were bet back into the game from the IRS reporting credit meter 204. The player continues playing in this manner until the player chooses to stop. The balance shown on the gaming device's IRS reportable credit meter 204 is the balance that must be reported on the W2-G Form. A slot machine attendant will prepare the W2-G Form 208 and then use a manual credit meter reset key 209 to reset the IRS credit meter 204. The player will be paid by the attendant 210 or from the hopper 206. Typically, any amount over the IRS predetermined limit will be hand paid. Lesser amounts can be paid either way depending on management's policies.

The present invention allows the player to play without annoying interruptions and provides a mechanism for reporting more accurate amounts to the IRS.

Figure 4:
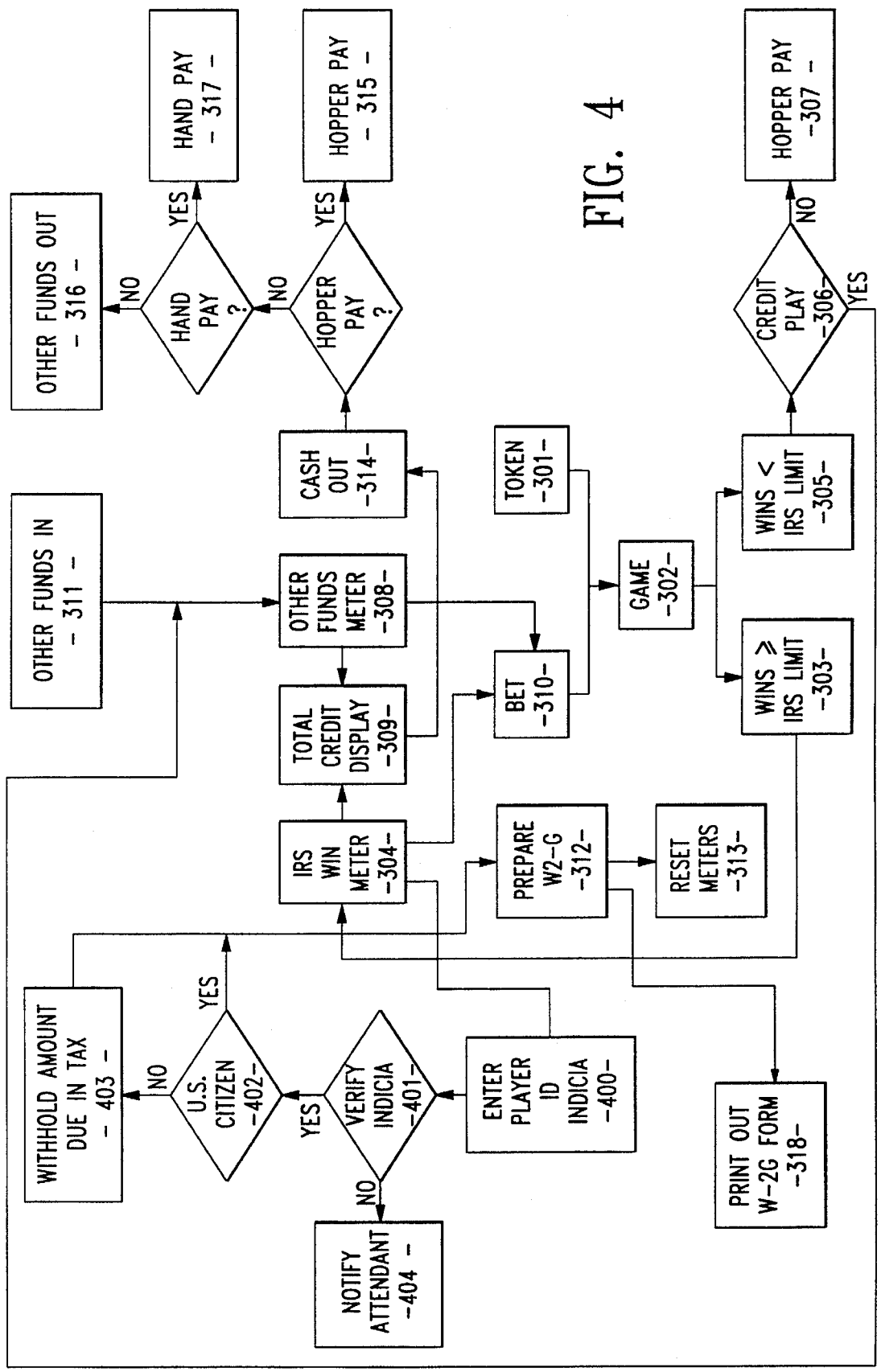
FIG. 4 is a block diagram flow chart of a second embodiment of the method of reporting reportable winnings of the present invention.

Referring to FIG. 4, the flow chart for an alternative embodiment of the present invention is shown in which tokens, coins and/or other funds are played.

Electronic gaming devices are being enhanced to accept funds from other sources. For example, many gaming devices allow the player to use paper currency. The number of credits corresponding to the value of the paper currency is placed on the credit meter and the player is allowed to play, using the bet button as described above, for credits that were transferred to the conventional credit meter. When funds are transferred directly to the conventional credit meter from such an outside source, the value of those funds must be excluded from the amount reported on the W2-G Form because they are not reportable winnings. Gaming devices operating in this mode will require separate meters to accumulate wins subject to IRS reporting separately from funds that are not subject to this reporting.

As shown in FIG. 4, the operation is as follows: The player initiates a game by inserting a token 301 into the gaming device or pressing the bet button 310. The game 302 is played. If the game results in a winning combination of symbols, the logic in the gaming device's microprocessor checks whether the dollar value of the payout is equal to or greater than the present IRS limit. If this is true 303, the number of credits corresponding to the payout amount is automatically transferred to the IRS win meter 304. If the payout is less than the IRS limit 305, the gaming device's microprocessor will check to see whether the player is playing the machine in credit mode 306. If not, tokens will be paid out of the hopper 307. In credit mode 306, funds will be automatically added to the other funds meter 308. This other funds meter 308 accumulates funds that are available for the player to play that are not subject to IRS reporting.

The total amount of funds from the IRS reporting win meter 304 and the other funds meter 308 will be shown on the total credit display 309. The credit display 309 is the only credit meter the player will see. When the player chooses to play a game using credits, he will press the bet button 310. The gaming device's microprocessor will first check to see if there are funds available from the IRS win meter 304. If there are, those funds will be used to play the game. If not, funds will be used from the other funds meter 308. This part of the invention will allow the player to play from a single credit meter while automatically keeping track of the two types of funds.

Funds that a player supplies through a currency acceptor or other external source 311 will be added directly to the other funds meter 308 where they will be available for play when the IRS win meter 304 is depleted.

When the player chooses to stop playing, the following events will happen:

1. Either an attendant will access the IRS win meter 304 and prepare a W2-G Form 312 for the balance of the meter. At 313 on the diagram, a manual key would be used to reset the IRS win meter 304 and make the total credit display 309 balance available for payment to the player; or 2. A print out 318 corresponding to the amount of winnings stored in the IRS win meter 304 is automatically printed directly onto a W2-G Form including all of the required information of the player, thereby eliminating any manual preparation of the W2-G Form. The printout 318 is either printed at the slot machine or some other convenient location and the IRS win meter 308 is either reset automatically or manually as described above; and 3. The player can then cash out 314 through a hopper pay 315 through a handpay 317 or by whatever other means may be provided 316.

This embodiment of the invention allows the player to play a slot machine capable of accepting tokens or funds from other sources without annoying interruptions and maintains accurate IRS reporting.

It is also possible to incorporate a third meter that provides a total net win or loss of all play on the slot machine in a given session. This can be achieved by having a meter that keeps track of all amounts of play, adding both reportable and non reportable winnings, and subtracting all amounts bet. At the end of a session the attendant can issue a separate report in addition to a W2-G Form, showing the net win or loss of the player. At the present time, such information can be obtained from the players that use casino slot machine cards that are inserted in a reading device associated with the slot machine that records all aspects of play. However, this information is not available at the location of the slot machine itself.

Alternatively, it also possible to have the player enter identification indicia 400 used to identify the player. The identification indicia may be a unique code assigned by the casino to the individual or may be the player's signature that is electronically reproduced by means well known by those skilled in the art, and stored in a microprocessor. At the time the identification indicia is assigned, player information such as, but not limited to, the player's name, tax identification number, and country of citizenship may be recorded and stored together with the identification indicia of the player, for future retrieval and used for completing the W-2G Form.

The player may be prompted when the IRS limit is reached, to enter the player identification indicia 400. The identification indicia entered is verified 401 with the stored identification indicia assigned to that player. For example, if the identification indicia is an electronic reproduction of the player's signature, the player signs an electronic signature pad, well-known by those skilled in the art, and the entered signature is compared with the stored signature for that player. If the identification indicia is verified, the player may proceed to play the game 302 with a token 301 or by using other funds 311 or cash out. If the identification indicia is not verified, an attendant is notified 404 and a W-2G Form is prepared manually.

At the end of the session of play, a W-2G Form is created for the player as described above, with the player's information that was supplied and stored at the time the identification indicia was assigned to the player.

The use of identification indicia for each player further permits citizenship verification 402 of the player for determining whether withholding 403 of the amounts due in taxes prior to paying out is required if the player is not a citizen of the United States.

It is appreciated that the entry of player identification indicia 400 may have other uses other than determining citizenship of the player as described above without departing from the scope of the present invention.

While the present invention has been described in association with a preferred embodiment, it is recognized that other variations of the invention may be derived that do not depart from the invention's concept.

For example, any other payout devices, such as pinball machines, can be used in place of a slot machine. Also, the type of game played on the slot machine is irrelevant. The scope of this invention also includes machines which may be equipped to only operate using funds transferred from and to another source; in other words, gaming devices that do not use tokens.

While the present invention has been described with regards to the preferred embodiment, it is appreciated that other variations of the present invention may be devised which do not depart from the inventive concept of the present invention.

What is claimed is:

1. A gaming apparatus comprising:

means for accepting a bet by a player;

apparatus for providing a payout in response to said bet;

means for setting a payout threshold above which payouts must be reported to the IRS;

IRS credit storage means for storing as credit the amount of payouts equal to or greater than said payout threshold;

means for preventing payout of said credit in said IRS credit storage means by said player; and means for permitting the use by a player of said credit in said IRS credit storage means for making a further bet.

2. The apparatus of claim 1 including a second storage means for storing the value of any payouts less than said threshold.

3. The apparatus of claim 2 including means for displaying the value of the total of said first and said second storage means.

4. The apparatus of claim 2 including a first display means for displaying the value of the first storage means and a second display means for displaying the value of the total of said first and said second storage means.

5. The apparatus of claim 1 including display means for displaying the value of a first stored amount.

6. The apparatus of claim 5 including means for displaying the value of a second stored amount.

7. A gaming apparatus comprising:

a means for playing a game; a means for accepting monetary units for play of the game;

means for storing the amount of winnings from the play of the game;

a first storage means for storing the amount of winnings over a predetermined amount on any one play of the game;

means for permitting the use of the credit in the first storage means for further play of the game; and separate means for paying out winnings less than the predetermined amount.

8. A method of calculating the amount of reportable winnings to the Internal Revenue Service in a gaming apparatus having a payout means;

a first storage means for storing a first value of winnings over a predetermined amount, comprising the steps of:

playing the game;

if the amount of winnings is more than the predetermined amount storing said amount of winnings in said first storage means;

using the values stored in said first storage means to place a bet;

preparing an IRS form at the end of the play session corresponding to the value in said first storage means; and paying the player the winnings.

9. The method of claim 8 in which said gaming apparatus includes lock means for locking the gaming apparatus to prevent payout of the amount of winnings stored in said first storage means.

10. The method of claim 9 including the additional steps of unlocking the machine and resetting the first storage meter to zero.

11. A gaming apparatus comprising:

means for playing a game;

means for accepting monetary units for play of the game;

first credit storage means for storing as credit the amount of winnings below a predetermined amount on any one play of the game;

IRS credit storage means for storing as credit the amount of winnings equal to or over the predetermined amount on any one play of the game;

utilizing means for using the credit in said first and IRS credit storage means for further play of the game, said utilizing means exhausting first the entire credit stored in said IRS credit storage means prior to utilizing the credit stored in said first credit storage means for further play of the game; and payout means.

12. The apparatus of claim 11 further including printing means for printing a report at the end of the game if the amount of winnings stored as credit in said IRS credit storage means is equal to or over the predetermined amount.

13. The apparatus of claim 12 in which said report is a tax report to the Internal Revenue Service.

14. The apparatus of claim 11 further including separate means for paying out winnings less than the predetermined amount.

15. The apparatus of claim 11 further including first display means for displaying the value of the credit stored in said first credit storage means.

16. The apparatus of claim 15 further including second display means for displaying the value of the credit stored in said IRS credit storage means.

17. The apparatus of claim 11 further including combined display means for displaying the combined amounts of winnings stored in said first and IRS storage means.

18. The apparatus of claim 11 further including means for entering and storing player identification indicia for a player; and verifying means for verifying the identity of the player by verifying said identification indicia entered by the player to permit play of the game.

19. The apparatus of claim 18 in which if the player identified is a citizen of the United States, said apparatus pays out the net amount of winnings; and if the player identified is not a citizen of the United States, said apparatus withholds an amount equal to the amount due in taxes from the net amount of winnings prior to paying out.

20. The apparatus of claim 18 in which said player identification indicia is a unique code assigned to the player.

21. The apparatus of claim 18 in which said player identification indicia is an electronic representation of the player's signature.

22. A method of calculating the amount of reportable winnings to the Internal Revenue Service (IRS) in a gaming apparatus having a payout means;

a first storage means for storing a first value of winnings below a predetermined amount;

an IRS storage means for storing a second value of winnings over a predetermined amount, comprising the steps of:

playing the game;

if the amount of winnings is lower than the predetermined amount, storing said amount of winnings in said first storage means;

if the amount of winnings is equal to or more than the predetermined amount, storing said amount of winnings in said IRS storage means;

using the values stored in said IRS storage means to place a bet for further play of the game until said IRS storage means is exhausted before using the values stored in said first storage means to place a bet for further play of the game;

preparing an IRS form at the end of the play session corresponding to the value in said second storage means; and paying the player net amount of winnings.

23. The method of claim 22 in which the step of preparing an IRS form includes a printing means for printing a print out corresponding to the value stored in said IRS storage means at the end of the game.

24. The method of claim 23 in which said print out is a tax report form to the Internal Revenue Service.

25. The method of claim 22 in which said gaming apparatus further includes means for entering player identification indicia for a player, verifying means for verifying identity of the player by verifying said identification indicia entered by the player, including the steps of:

entering player identification indicia prior to beginning to play the game; and verifying the player identification indicia prior to beginning to play the game.

26. The method of claim 25 including the step of paying out the net amount of winnings, if the player identified is a citizen of the United States Citizen; and withholding an amount equal to the amount due in taxes on from the net amount of winnings prior to paying out, if the player identified is not a citizen of the United States.

27. The method of claim 25 in which said player identification indicia is a code assigned to the player.

28. The apparatus of claim 25 in which said player identification indicia is an electronic representation of the players signature.

29. A gaming apparatus comprising:

means for accepting a bet;

apparatus for providing a payout in response to said bet;

means for setting a payout threshold;

first storage means for storing the value of any payouts greater than said threshold;

means for preventing payout of said payouts;

a second storage means for storing the value of any payouts less than said threshold.

30. The apparatus of claim 29 including means for displaying the value of the total of said first and said second storage means.

31. The apparatus of claim 29 including a first display means for displaying the value of the first storage means and a second display means for displaying the value of the total of said first and said second storage means.

\* \* \* \* \*